United States Patent [19]

Kiger et al.

[11] 3,993,844

[45] Nov. 23, 1976

[54] COMPOSITE CERAMIC ARTICLES AND METHOD OF MAKING

[75] Inventors: William T. Kiger, San Mateo County, Calif.; George J. Kamin, deceased, late of Towanda, Pa; by Shirley A. Kamin, administratrix, Wellsboro, Pa.

[73] Assignee: GTE Sylvania Incorporated, Stamford, Conn.

[22] Filed: Dec. 30, 1974

[21] Appl. No.: 537,179

[52] U.S. Cl. ............................. 428/428; 106/55; 106/65; 106/69; 106/73.2; 156/89; 428/538; 428/539; 428/446; 428/448

[51] Int. Cl.² .................... B32B 9/04; C04B 35/18; C04B 35/50

[58] Field of Search ............... 106/65, 69, 55, 73.2; 428/446, 538, 539; 57/74; 252/301.4 F

[56] References Cited
UNITED STATES PATENTS

| | | | |
|---|---|---|---|
| 3,359,210 | 12/1967 | Jaffe | 252/301.4 F |
| 3,503,894 | 3/1970 | Wachtel | 106/65 |
| 3,673,049 | 6/1972 | Giffen et al. | 106/73.2 |
| 3,719,550 | 3/1973 | Arendt | 106/65 |
| 3,833,389 | 9/1974 | Komeya et al. | 106/65 |

FOREIGN PATENTS OR APPLICATIONS 1,180,696  2/1970  United Kingdom

OTHER PUBLICATIONS

I. A. Bondar et al. Phase Equilibriums in the $Y_2O_3$ $Al_2O_3$, $SiO_2$ Systems, Izv. AKad. Nauk. SSSR Ser. Khim pp. 1325–1326 vol. 7—1964.

Bondar et al., Izv. Akad. Nauk. SSSR Ser. Khim 1964(7) 1325–1326 (cited from Chem. Abs. vol. 64, 1966 16708g.

Primary Examiner—George F. Lesmes
Assistant Examiner—R. J. Roche
Attorney, Agent, or Firm—Norman J. O'Malley; John C. Fox; Donald R. Castle

[57] ABSTRACT

Ceramic bodies coated or joined to one another with ceramic eutectic compositions of alumina, silica and rare earth oxides melting below 1600° C are described. An exemplary composition contains about 20 weight percent alumina, 58 weight percent silica, and 22 weight percent yttria. Composite structures of such bodies exhibit good to excellent thermal shock resistance, resistance to chemical attack, and joint strengths between bodies and coatings or between various silica, alumina and rare earth oxide based ceramics joined together or to each other.

3 Claims, 3 Drawing Figures

COMPOSITE CERAMIC ARTICLES AND METHOD OF MAKING

BACKGROUND OF THE INVENTION

Field of the Invention

This invention pertains to composite structures of ceramic bodies coated or joined together by ceramic eutectic compositions, and to a method for forming such structures, and more particularly pertains to such structures including ceramic eutectic compositions in the alumina, slica, rare earth oxide systems.

It is common practice to coat ceramic materials with various other materials to give smooth, chemical resistant and shock resistant surfaces. The principles of glazing have been used for centuries and are adequately discussed in most ceramic texts. See for example: *Elements of Ceramics*, F. H. Norton, Addison-Wesley Publishing Company, Reading, Massachusetts, 1957; and *Introduction to Ceramics*, W. D. Kingery, John Wiley & Sons, Incorporated, New York, New York, 1967. Usually glazes are applied to a completed ceramic piece as a slurry of blended finely ground oxides and salts and then fired to form the coating at temperatures somewhat below the usual densificaton temperature of the ceramic material to be coated. In some instances, it is possible to densify the green ceramic and glaze in a single operation.

Such operations require high temperatures and careful control of conditions to avoid formation of occulusions or inclusions along the weld line, which would weaken the structure.

In many operations, especially in the preparation of phosphors for television tubes and fluorescent lighting, it would be quite advantageous to have a glaze to apply to silica, silicon carbide or other ceramic materials, in order to minimize contamination of the phosphors from the ceramic containers of these materials used in firing. Such glazes would have to be quite chemically resistant to attach by the fluxing agents often used in preparation of the phosphors. Such glazes would also have to be capable of repeated and strenuous thermal cycling. Until the present time the only glazes or coatings which have been found to be effective have been vapor deposited films of materials such as yttrium slicate, which are relatively expensive to produce. Thus, for economic reasons these coatings do not answer the problem of providing easily applied coatings possessing high thermal shock resistance and high chemical resistance to attack.

The joining of ceramics is very common in instances such as mortaring of brick, block, etc. It is usually not necessary to form a strong weld or joint between ceramic pieces and little information is available on such formation. Where strong joints are necessary between similar ceramics, they are usually made by direct welding or fusing the pieces together, as is commonly done in the joining of fused silica tubes. However, it is unusual to attempt to join dissimilar ceramic materials by this technique, due to differences in thermal expansion.

There are instances in which some ceramic materials possessing desirable characteristics for certain applications are nevertheless economically or physically unsuited for use in thick slabs or massive pieces. It would therefore be advantageous if such materials could be applied as thin films or layers and tightly bonded to a more economical or more readily machinable base ceramic. For example, yttrium silicate, an expensive ceramic with excellent thermal shock and chemical attack resistance cannot be bonded to an inexpensive base ceramic such as silica in a manner to withstand high temperatures except by cumbersome and expensive techniques, such as vapor deposition.

SUMMARY OF THE INVENTION

In accordance with this invention, it has been discovered that a class of ceramic eutectic compositions from the alumina, silica, rare earth oxide systems melting at temperatures below 1600° C and preferably below 1500° C are suitable as chemical and thermal shock resistant coatings on ceramic bodies and for joining silica, alumina or rare earth-based ceramics together or to each other in a manner similar to the brazing of metals and alloys. These compositions are exemplified by the areas A (compositions melting below 1500° C) and B (compositions melting below 1600° C) of the ternary phase diagram of the alumina, silica, yttria system depicted in FIG. 1.

While it is contemplated that the eutectic ceramic composition may be formed by conventional techniques such as mixing desired proportions of the three component oxides or their precursors and firing, one embodiment also contemplates formation of the composite structures of the invention by firing a layer containing less than all of the components of the desired eutectic composition while in contact with the surface of a ceramic body whose major component comprises the missing eutectic component, at a temperature below the deformation temperature of the body, but for a time sufficient to achieve formation of the desired eutectic by solid or liquid diffusion of components across the interface between the body and the layer.

While the term eutectic composition normally means a specific composition having the lowest melting point within a phase system, as used herein the term eutectic is meant to refer to a range of compositions surrounding such one lowest melting composition, and is more specifically defined as compositions within an area of the ternary phase diagram bounded by a specified isothermal liquidus-solidus line, that is, those compositions melting below 1600° C, and preferably below 1500° C.

As used herein, the term precursor is meant to refer to any compound or mixture of compounds of silicon, aluminum or rare earth element which upon heating above its decomposition temperature in a nonreducing atmosphere will yield an oxide compound. Examples of such compounds are the carbonates, sulfates, nitrates, oxylates, etc.

DETAILED DESCRIPTON OF THE INVENTION

The materials capable of forming the ceramic eutectic composition upon firing are readily prepared by intimately mixing desired proportions of the oxides or the oxide precursors. These are preferably of a small particle size to assure subsequent rapid formation of the eutectic composition upon firing. In practice, particles less than 325 mesh have been used, although this is not a definitive lower limit. After thorough blending, the mixture may be slurried with water or combined with some other volatile or fugitive coating vehicle and applied to the surface to be coated or joined. The vehicle is then removed from the coating either by a separate preliminary heating step or during the preliminary stages of firing. Firing times and temperatures are not critical. However, the temperature should preferably exceed the melting point of the eutectic composition but not the deformation point of the ceramic bodies to be coated or joined.

In addition the particular end use envisioned for the composite structure may dictate firing temperatures appreciably below the deformation point of the body in order to avoid deleterious effects upon some other desired final property of the composite structure, as may be readily appreciated by those skilled in the art.

An alternative method of applying the material is by flame spraying a dry powder mixture, whereby the powders are applied to the surface of the ceramic body in a molten or heat softened condition. In such instances, it could be advantageous to form the eutectic composition prior to flame spraying by melting the oxides in a crucible, cooling the melt, and grinding the solidified material into powder for use as the feed for the spraying operation. Alternatively, where flame spraying of powder mixtures of separate components does not achieve complete reaction to form the eutectic composition, a separate in situ heat treatment of the coating may be required.

Compositions within the alumina, silica, yttria system suitable for the practice of the invention range from about 11 to 33 weight percent alumina, 25 to 59 weight percent silica, and 22 to 53 weight percent yttria. While compositions containing low amounts of yttria may be preferred from a cost standpoint, compositions containing from 15 to 25 weight percent alumina, 35 to 45 weight percent silica, and 35 to 45 weight percent yttria are preferred in that these compositions permit joining of most alumina, slica or rare earth based ceramics.

Rare earth oxides suitable for use in the invention other than yttrium oxide are those which form similar eutectics with alumina and silica melting below 1600° C, such as Europium and Samarium oxides.

Figure 1:
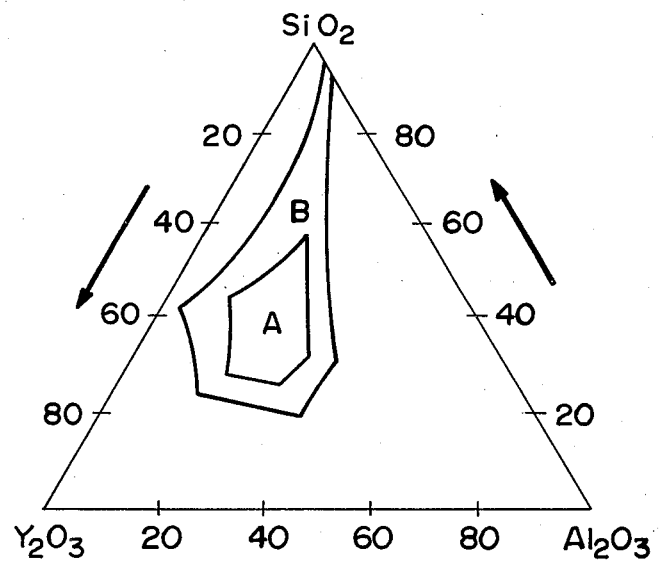
FIG. 1 is a ternary phase diagram for the alumina, silica yttria system wherein the areas A and B respectively designate ternary eutectic composition used to form the composite ceramic structures of the invention.
Figure 2:
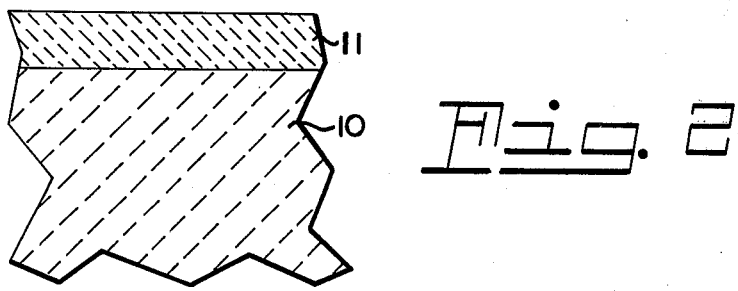
FIG. 2 is a cross-section of a coated composite structure of the invention.
Figure 3:
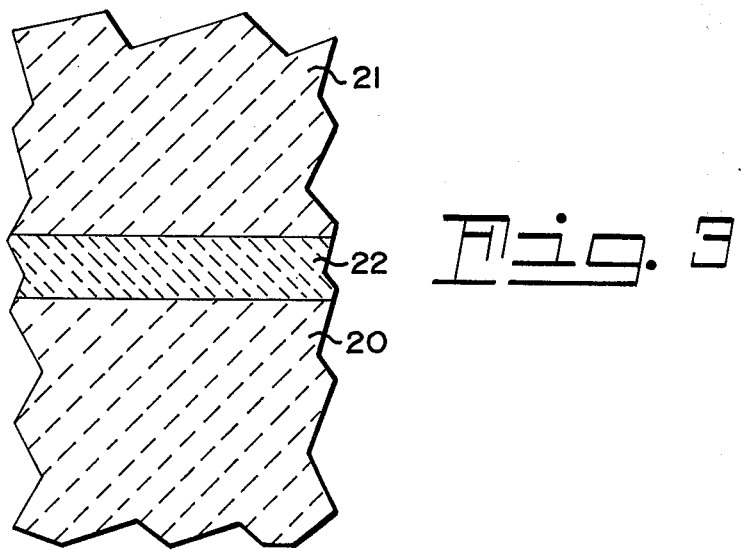
FIG. 3 is a cross-section of a joined composite structure of the invention.

Referring now to FIG. 2, there is shown a cross-section of a ceramic body 10 coated with a layer 11 of a ternary eutectic composition described herein. FIG. 3 shows a cross-section of two ceramic bodies 20 and 21 joined by a layer 22 of a ternary eutectic composition described herein. Bodies 20 and 21 are silica-based, alumina based or rare earth based, ie, containing at least 25 weight percent of one of these components.

By way of example and not by way of limitation, the eutectic ceramic compositions described above may be used to coat silicon carbide, silica and alumina bodies to render them chemically resistant for use in such applications as phosphor production. The compositions may be used to join alumina bodies to other alumina bodies, fused silica to fused silica bodies, yttrium silicate to yttrium silicate, and yttrium silicate to silica. The compositions may be used for example to repair breaks in furnace liners. In one instance, it has been found that silica plates joined by a eutectic composition show cracks after repeated thermal shock testing, which do not propagate across the eutectic joint layer. These results indicate that while individual plates may have failed under such testing, the joined plates maintain structural integrity. Such results suggest significantly extending the life of a large variety of ceramic articles which are normally subjected to severe thermal shock. For example, double walled fused silica tube liners for furnaces could be formed by joining two silica tubes together one within the other. Yttrium silicate or other ceramic tubes and plates could be joined together to make strong flat bottom crucibles. Such examples are in no way intended to be limiting regarding application of the teachings of the invention. Any rare earth, silica or alumina based ceramic may be joined to any other rare earth, alumina, or silica based ceramic, as long as the relative thermal expansion coefficients are sufficiently matched to each other and to that of the eutectic composition so that undue strain is not placed upon the joint during use in the envisioned application.

EXAMPLE I 91.5 g of $Al_2O_3$, 98.0 g of $Y_2O_3$, and 264.5 g of $SiO_2$ are blended for 8 hours in a polyethylene bottle on a roller blender. (All materials are <325 mesh.) Enough deionized water is added to the blended powders to make a thick slurry. The slurry is then spread over the surface of a silicon carbide plate. The plate is then heated in an oven for 2 hours at 120° C to remove the water. The plate is fired at 1500° C for 8 hours.

After firing, the silicon carbide plate is completely covered by a white glasslike coating, even at the bottom of the holes. The plate is used to fire mixtures for preparation of fluorescent lamp phosphors. The phosphors show no reaction with the material and show no loss in phosphor brightness. The same phosphors fired in contact with uncoated plates of SiC show severe loss in lumen output.

Plates are cycled through ten runs up to 1200° C with no evidence of cracking on the glaze or separation from the silicon carbide.

EXAMPLE II

A slurry is prepared as mentioned previously of a composition containing 10.0 g $Al_2O_3$ 20.0 g $Y_2O_3$, and 20.0 g $SiO_2$. The slurry is placed between two plates of yttrium silicate, the pieces dried at 120° C for 2 hours, and then fired at 1450-1500° C for 8 hours.

The yttrium silicate plates are tightly joined by a translucent layer of ceramic material. The material is cycled from 1200° C to room temperature with direct air quenching for 10 cycles with no evidence of cracking or weakening of the joint.

EXAMPLE III

A composition as described in Example II is used to fuse a silica plate to a yttrium silicate plate.

EXAMPLE IV 5.0 g of amorphous $SiO_2$ and 5.0 g of $Y_2O_3$, both powders of less than 325 mesh size are intimately mixed in a mortar pestle. Enough deionized water is added to form a thick paste. The paste is then spread on an alumina plate. The plate is dried at 120° C to remove the water and then fired at 1450–1500° C for 8 hours. The alumina plate, now coated with a hard glaze, is cycled to 1100° C 20 times with no evidence of separation or cracking of the surface coat, even though the plate itself cracks during the thermal shocking. X-ray diffraction analysis verifies the formation of eutectic of $Al_2O_3$, $SiO_2$ and $Y_2O_3$.

The glazed plate is used to fire yttrium oxide-europium oxide powders at 1200° C. No reaction is evident between the surface of the glaze and the powders, and they can be readily brushed from the surface of the glaze.

EXAMPLE V

A 1:1 weight ratio of $SiO_2$ and $Y_2O_3$ is prepared as in Example IV. The slurry is spread between two alumina discs and the discs are fired at 1500° C for 8 hours after drying at 120° C for 2 hours to remove the water.

The two discs are bonded tightly together by a layer of polycrystalline eutectic, as verified by x-ray diffraction analysis. Heating and cooling at less than 100° C per hour up to 1200° C shows no weakening of the bond, and the pieces retain their integrity after five cycles. Three cycles of rapid heating from room temperature to 1200° C and then air quenching to room temperature do not impair the bond.

EXAMPLE VI 5.1 g of $Al_2O_3$ and 6.8 g of $Y_2O_3$, both powders of less than 325 mesh, are intimately mixed and ground in a mortar and pestle. Enough water is added to the powders to make a thick paste-like slurry. The slurry is spread over the surface of a fused quartz plate.

The plate is dried at 120° C to remove the water and then fired at 1450° –1500° C for 8 hours. A smooth, hard transparent coating of eutectic is formed on the surface of the quartz. Phosphors fired in contact with the plate show the same results as in Example IV.

EXAMPLE VII

A slurry is prepared with $Al_2O_3$ and $Y_2O_3$, as in Example VI. The slurry is spread between two quartz plates, dried at 120° C for 2 hours, and then fired at 1450°–1500° C for 8 hours. The plates are tightly bonded by a glasslike eutectic layer. Heating and cooling to 1200° C at the rate of 100° C per hour shows no weakening of the bond even after five cycles. Rapid heat cycling from room temperature to 1200° C followed with air quenching to room temperature does not weaken the bond even after 10 cycles. The surfaces of the quartz plates exhibit slight cracking, but the pieces remain intact and bonded together. A piece of the bonded material is then repeatedly quenched in water from 1200° C. After five cycles, the piece shows significant cracking, but no cracking along or across the bonding eutectic takes place. Microscopic examination shows that the cracks propogate all the way through the quartz plates but not across the eutectic bonding zone.

While there has been shown and described what are at present considered the preferred embodiments of the invention, it will be obvious to those skilled in the art that various changes and modifications may be made therein without departing from the scope of the invention as fined by the appended claims.

What is claimed is:

1. A composite structure comprising at least two ceramic bodies, each body selected from the group consisting of rare earth based, alumina based, and silica based ceramic compositions, said bodies having at least a portion of their respective surfaces joined by a eutectic composition of alumina, silica and rare earth oxide wherein the eutectic composition consists essentially of, in weight percent, 11–33 percent alumina, 25 to 59 percent silica, and 22 to 53 percent of said rare earth oxide.

2. The composite structure of claim 1 wherein the rare earth oxide is an oxide of an element selected from the group consisting of Yttrium, Samarium and Europium.

3. The composite structure of claim 2 wherein the rare earth oxide is yttria.

* * * * *